United States Patent [19]
Collin et al.

[11] Patent Number: 5,730,002
[45] Date of Patent: Mar. 24, 1998

[54] PROCESS AND DEVICE FOR FRACTIONATING A FLUID CONTAINING SEVERAL SEPARABLE CONSTITUENTS, SUCH AS A NATURAL GAS

[75] Inventors: Jean-Claude Collin, Marsinval-Verneuil; Alexandre Rojey, Rueil Malmaison, both of France

[73] Assignee: Institut Francais du Petrole, Rueil Malmaison, France

[21] Appl. No.: 731,240

[22] Filed: Oct. 11, 1996

[30] Foreign Application Priority Data

Oct. 11, 1995 [FR] France ................... 95 12003

[51] Int. Cl.$^6$ ........................................ F25J 1/00
[52] U.S. Cl. ................ 62/620; 62/905; 202/158; 196/100
[58] Field of Search ................ 62/620, 905; 202/158; 196/100

[56] References Cited

U.S. PATENT DOCUMENTS

| | | | |
|---|---|---|---|
| 3,575,007 | 4/1971 | Gunther | 62/620 |
| 3,631,683 | 1/1972 | Tanz et al. | 62/620 |
| 4,273,566 | 6/1981 | Schwartz | 62/620 |
| 4,726,826 | 2/1988 | Crawford et al. | |

FOREIGN PATENT DOCUMENTS

| | | |
|---|---|---|
| 0553706 | 8/1993 | European Pat. Off. |
| 992599 | 10/1951 | France |
| 669104 | 3/1952 | United Kingdom |

Primary Examiner—Ronald C. Capossela
Attorney, Agent, or Firm—Antonelli, Terry, Stout & Kraus, LLP

[57] ABSTRACT

A gas containing at least two constituents A and B having different temperatures is fractionated by carrying out at least the two cooling and contacting phases as follows:

a) during a first stage, said gas is at least partly cooled to cause condensation of at least a first liquid fraction and said gas is brought into contact with said liquid fraction in at least a first zone of contact and heat exchange Z1, and at least a liquid fraction enriched in constituent A and at least a gaseous fraction are collected at the outlet of said first zone of contact and heat exchange Z1, b) during a second stage, said gaseous fraction from stage a) is at least partly cooled to cause condensation of at least a second liquid fraction and said gaseous fraction is brought into contact with said second liquid fraction in at least a second zone of contact and heat exchange Z2, and at least a liquid fraction enriched in constituent B and at least a gaseous fraction are collected at the outlet of said second zone.

15 Claims, 6 Drawing Sheets

PROCESS AND DEVICE FOR FRACTIONATING A FLUID CONTAINING SEVERAL SEPARABLE CONSTITUENTS, SUCH AS A NATURAL GAS

FIELD OF THE INVENTION

The main object of the present invention is a process for fractionating a fluid consisting at least of a gas phase and of several constituents presenting a characteristic allowing to differentiate them in the operating conditions of the process.

Some fluids contain constituents that may be differentiated by at least one characteristic or one parameter in the operating conditions of the process, notably the value of the boiling-point or of the condensation temperature thereof.

The present invention is particularly well-suited for fractionating natural gases, gases associated with hydrocarbon condensates or gases resulting from the processing of petroleum fractions. All these gases comprise at least methane and hydrocarbons in variable amounts, such as ethane or ethylene, and the higher hydrocarbons ($C_3$ or higher).

In the following description, all the hydrocarbons comprising at least three carbon atoms are referred to as $C_3+$, all the hydrocarbons comprising at least four carbon atoms are referred to as $C_4+$ and all the hydrocarbons comprising at least five carbon atoms are referred to as $C_5+$.

The term "processed gas" refers to a gas at least depleted in heavy hydrocarbons.

BACKGROUND OF THE INVENTION

The prior art describes various industrial processes and plants allowing selective extraction of ethane and of compounds heavier than ethane, or propane and compounds heavier than propane.

In most cases, the gas to be processed is partly condensed by cooling at low temperature, then separated in a separating drum. The liquid phase formed by condensation is thereafter processed in a conventional distillation column, the heavy compound or compounds of the desired charge are recovered at the bottom of this column and the gas phase is collected at the top thereof.

The device described in patent FR-2,571,129 comprises an exchanger in which cooling and rectification of the gas phase are performed simultaneously. This process does not allow to extract, in the same plant, either a LPG fraction and the natural gasoline formed by a $C_5+$ fraction or the ethane and a LPG fraction or a natural gasoline fraction.

In patent FR-2,578,637, the fractionating plant comprises a gas partial condensation enclosure, an exchanger with simultaneous gas rectification and a fractionating column. The $C_3+$ cut can be extracted with yields higher than 95%. However, using three different devices increases the cost and the size of the gas process facility.

Gas fractionating plants described in the prior art comprise in most cases several devices that increase the size of the process units and process costs.

SUMMARY OF THE INVENTION

The invention aims at proposing a process for treating and/or for fractionating a fluid comprising at least two constituents having a parameter that allows to distinguish or to separate them during the process with the aid of suitable means.

The fluid is advantageously a gas comprising at least two condensable constituents whose boiling-point or condensation temperatures are different.

The process implemented according to the invention allows to fractionate the gas by producing selectively one or several of its constituents and, at the same time, to recover them according to their composition and/or to the producer's request.

Simultaneously, during the fractionating operation, the fluid can be subjected to a processing other than fractionation, for example dehydration, by using a suitable product such as a solvent.

The present invention thus relates to a process for treating and/or for fractionating a gas containing at least two constituents A and B such that the boiling-point temperature of constituent A is higher than the boiling-point temperature of constituent B.

It is characterized in that it comprises at least the following stages:

a) during a first stage, said gas is at least partly cooled to cause condensation of at least a first liquid fraction and said gas is brought into contact with said first liquid fraction, for example in a zone of contact and heat exchange Z1, the first liquid fraction exhibiting a countercurrent flow in relation to the gas, in order to collect separately, for example at the outlet of the zone of contact and heat exchange, at least a liquid fraction enriched in constituent A and at least a gaseous fraction, the first liquid fraction resulting for example at least partly from condensation, b) during a second stage, the gaseous fraction from stage a) is at least partly cooled to cause condensation of at least a second liquid fraction and said gaseous fraction is brought into contact with the second liquid fraction, for example in a second zone of contact and heat exchange Z2, the gaseous fraction exhibiting a countercurrent flow in relation to the second liquid fraction, in order to collect separately, for example at the outlet of the second zone of contact and heat exchange Z2, at least a liquid fraction enriched in constituent B and at least a gaseous fraction depleted in constituent A and/or B.

The depleted gaseous fraction forms at least partly the processed gas.

The contact achieved in at least one of zones Z1 and Z2 is for example advantageously performed at least partly in a countercurrent flow between the ascending gas or gas phase and the descending liquid phase.

The gas and/or the gas phase are cooled by at least partly continuous heat exchange. A fluid circulating in a countercurrent flow along at least one of the zones of contact and heat exchange can be used therefore.

According to an embodiment example of the process, several successive stages of cooling and of contacting of the gas and/or of a gas phase are carried out so as to obtain for example n liquid fractions having different, for example increasing volatilities, the n liquid fractions are discharged as one goes along and the gaseous fraction resulting from a given stage is sent to the next stage for example. The gaseous fraction depleted in liquid fractions is for example collected during the last stage and forms at least partly the processed gas.

According to another embodiment variant of the process according to the invention, a fluid such as a solvent can be advantageously injected during at least one of the cooling and contacting stages.

According to another possibility, the invention relates to a process for fractionating and/or for treating a fluid comprising at least a gas phase and at least two constituents A and B that differ in at least one parameter in the conditions of the process, allowing their separation from the gas phase and/or separation from one another.

It is characterized in that it comprises at least the two stages as follows:
- a first stage during which said fluid is sent to a first zone of contact and heat exchange Z1 in order to achieve bringing into contact, with matter exchange, of said fluid and of the phases comprising said constituents that can be separated according to at least one characteristic parameter, and to achieve separation of said constituents of the fluid and of the gas phase, so as to form at least a first phase comprising at least one of said constituents, for example constituent A, said first phase being separated from said fluid, and
- a second stage during which the fluid depleted in constituent A is sent to a second zone of contact and heat exchange Z2 in order to achieve bringing into contact, with matter exchange, of said fluid and of the phases comprising said separated constituents, and to achieve separation of said remaining constituents from the gas phase, in order to produce a second phase comprising at least one of the constituents other than constituent A, such as constituent B, and a gas phase depleted in separated constituents.

The present invention further relates to a device for fractionating a fluid comprising at least a gas phase and at least two constituents A and B differing at least in one parameter in the conditions of the process, allowing their separation from the gas phase and/or separation from one another. It is characterized in that it comprises at least a first and a second zone of contact and heat exchange (Z1, Z2). Each one of zones Z1 and Z2 comprises for example:
- a main circuit allowing matter exchange between the gas to be processed circulating in a countercurrent flow in relation to the condensed constituents so as to obtain separately, at the zone outlet, a liquid fraction enriched in condensed constituent and a gaseous fraction,
- said zones being separated by at least one means for drawing off or for extracting at least one of said constituents having condensed in the zone situated above the extraction means,
- means for connecting at least one of zones of contact and heat exchange Z1, Z2 to a line intended for delivering the gas to be processed, and/or to at least one line intended for discharging one of the separated constituents and for connecting the other zone to a line intended for discharging the gas phase depleted in separated constituents A and B.

Zones of contact and heat exchange Z1 and Z2 are for example situated in a single enclosure, for example an exchanger, or in two different places of the processing site and communicating with one another.

For a fluid comprising several constituents that can be differentiated for example by a characteristic thermodynamic parameter, such as their vaporization or condensation temperature, the enclosure is for example provided with at least one cooling circuit that communicates preferably indirectly with the main contacting circuit, so as to provide condensation of the different constituents, the condensed liquid phase being for example discharged through the line situated in the lower part thereof.

According to an embodiment providing simultaneously a processing of the fluid other than its fractionation, the device can comprise at least one line intended for delivering a separation agent such as a solvent, said line being connected to the upper part of the main circuit.

The separation agent delivery line is for example situated at the level of at least one of said recovery means and/or at the level of one of said zones.

It is thus possible to communicate each of the constituent recovery or separation means with a line for delivering a fluid from outside. The nature of the separation agents depends for example on the position of the recovery means.

It advantageously comprises at least one means for stabilizing at least one of said liquid fractions drawn off and containing the separated constituents, and said means can be included in the fractionating device and preferably situated in the lower part thereof.

According to another embodiment, cooling is for example provided at least partly by the processed gas.

The process and the device according to the invention are advantageously used for fractionating a natural gas comprising at least water, methane and condensable hydrocarbons, such as $C_3+$ and/or possibly $C_2+$ hydrocarbons.

The process and the plant advantageously allow to:
- fractionate a fluid according to the producer's request and possibly to the transportation conditions (pipes and transportation network already installed),
- recover with a higher yield condensates that are products of higher value ($C_2+$. $C_3+$, ... , gasoline, etc),
- decrease the size of the process facilities and investments.

BRIEF DESCRIPTION OF THE DRAWINGS

Other features and advantages of the invention will be clear from reading the description hereafter, given by way of non limitative examples of applications to the processing of a natural gas, with reference to the accompanying drawings in which.

DESCRIPTION OF THE INVENTION

The process implemented according to the invention consists in fractionating a natural gas comprising several constituents that can be differentiated by at least one parameter in the operating conditions of the process, for example their boiling-point temperature.

In the case of a natural gas, it is thus possible to separate the hydrocarbons according to their composition, by obtaining liquid fractions of different volatilities, for example the LPG fraction that includes propane and the butanes (hydrocarbons with three or four carbon atoms) and the natural gasoline representing the $C_5+$ fraction.

Fractionation of the gas is advantageously performed in an enclosure comprising several distinct zones in which the hydrocarbon fractions are condensed and draw-off means separating these zones of contact and heat exchange. Fractionation is carried out by heat exchange between the gas and a cooling fluid, and by simultaneous and continuous matter transfer between the gas phase and the condensed liquid phase.

Thus, for a natural gas rich in hydrocarbons other than methane, the plant allows to fractionate and to recover liquid hydrocarbon fractions having different compositions, according to the composition of the processed gas and to the producer's request.

The fractionating enclosure can be associated with other means in order to subject the fluid to a processing other than fractionation.

For example, means allowing to introduce a fluid acting as a solvent and/or other fluids or means for stabilizing the separated hydrocarbon fractions.

Figure 1:
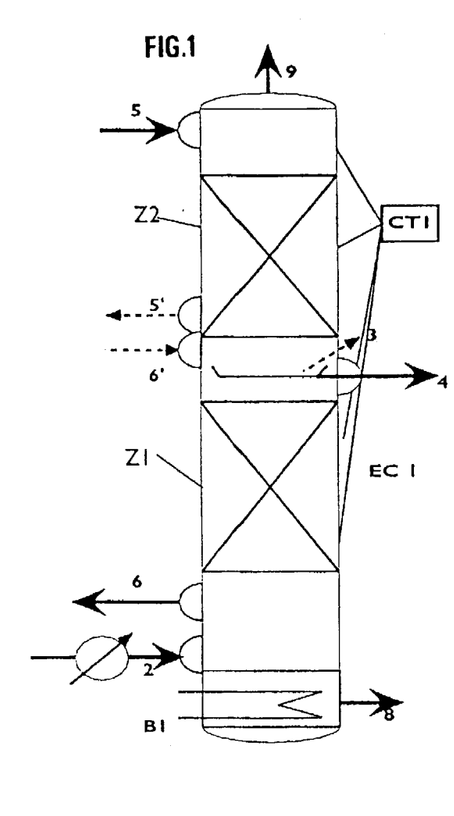
FIG. 1 schematizes a base diagram of a fractionating device equipped with separation means.

The principle of the process is illustrated in FIG. 1 and applied, by way of example, to a natural gas containing hydrocarbons other than methane.

The gas to be processed is fed into an enclosure EC1 such as a heat exchanger through line 2 situated in the lower part thereof.

It circulates in a first zone of contact and heat exchange Z1 connected to delivery line 2, then in a second zone of contact and heat exchange Z2 separated from the first zone Z1 by recovery means (3, 4). These means notably allow to extract hydrocarbons condensed in zone Z2.

It is simultaneously cooled by indirect heat exchange, for example through a wall (FIG. 9), by a heat-transfer fluid that enters the upper part of exchanger EC1 through line 5, circulates downwards so as to lower the temperature of the gas to be processed and leaves through line 6. Each one of zones of contact and heat exchange Z1, Z2 can comprise its own cooling circuit. The heat-transfer fluid of the cooling circuit of zone Z2 flows in through line 5 and leaves through line 5', and that of zone Z1 flows in through line 6 and leaves through line 6'. These heat-transfer fluids can come from one or several common sources.

The heat-transfer fluid preferably circulates in a counter-current flow in relation to the gas fed into the exchanger.

Figures 6, 7:
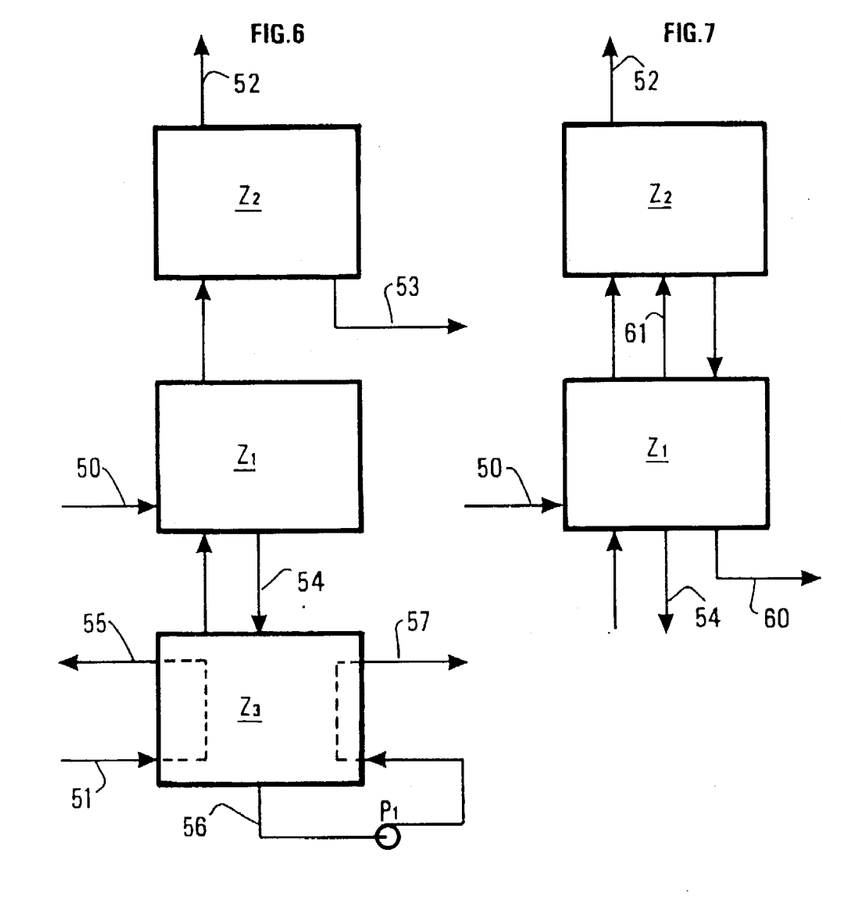
FIGS. 6 and 7 show embodiment variants where device for stabilizing is one of the zone of contact and heat exchange.

Other embodiment examples for the cooling circuit are described in FIGS. 6 and 7.

Zones of contact and heat exchange Z1 and Z2 are preferably substantially identical as for their manufacturing technology, and comprise each at least one main circuit allowing matter exchange or transfer between the gas to be processed exhibiting an ascending circulation, for example, and the constituent or constituents condensed during the process and circulating in a countercurrent descending flow.

Cooling causes condensation of the heavy hydrocarbons present in the gas. The condensed liquid hydrocarbon phase or phases flow downwards by gravity, in a countercurrent flow in relation to the processed gas that becomes progressively poorer in heavy compounds ($C_3+$ and higher hydrocarbons) because of the matter exchange. On the other hand, the condensed liquid hydrocarbon phase becomes gradually richer in heavier constituents.

Lowering of the temperature according to a given gradient in the exchanger allows to condense, in distinct zones, the different hydrocarbon fractions contained in the natural „as, the heaviest fractions being recovered at the bottom and the lightest fractions being collected at the top of the exchanger. It is also possible to recover, at the level of an intermediate zone situated between the lower and the upper part of the exchanger, a hydrocarbon fraction corresponding to a fixed boiling-point temperature range.

To recover for example the LPG fraction that includes propane and the butanes, and separately the natural gasoline representing the $C_5+$ fraction, the recovery means is for example a tray 3 communicating with zones of contact and heat exchange Z1 and Z2, and with the gas flow circuit or circuits. Its position within the exchanger is determined for example according to the nature of the cuts or hydrocarbons to be recovered and/or to the temperature prevailing at different levels or in various places of the column.

The condensed hydrocarbons enriched in propane and butane recovered at the level of tray 3 are at least partly discharged through lateral line 4.

The liquid hydrocarbon phase of tray 3 that has not been recovered is redistributed from the tray to the main circuit of zone Z1 in a descending flow prior to being discharged, after decanting, through line 8.

The processed gas depleted in heavy hydrocarbons is discharged at the top of column exchanger EC1 through line 9.

Figure 2:
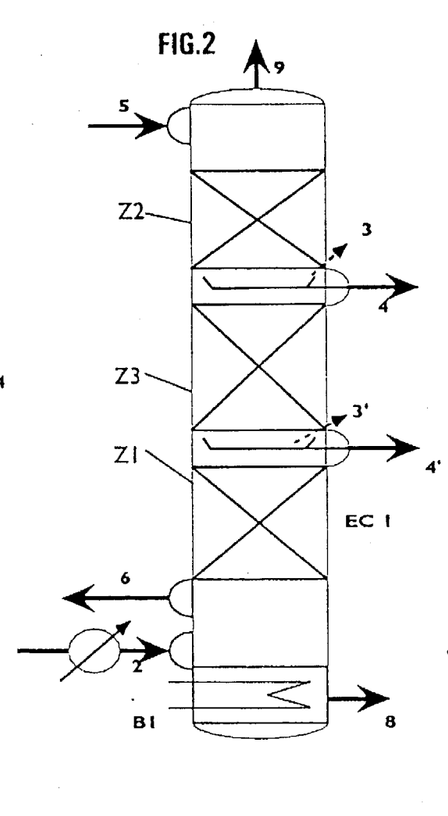
FIG. 2 is a variant of the device of FIG. 1 comprising two means for separating and for drawing off the separated phases.

FIG. 2 shows an embodiment example according to the invention where the exchanger is equipped with two recovery trays and lines connected thereto, respectively (3, 4) and (3', 4'), delimiting three zones of contact and heat exchange Z1, Z2 and Z3. The trays are distributed along the exchanger, for example according to the nature of the hydrocarbons to be collected, notably their condensation temperature and the temperature and/or temperature gradient present in the exchanger.

The temperature gradient caused in the exchanger is for example selected according to the nature of the gas and to the amount of condensed hydrocarbons, such as LPG and natural gasoline, to be recovered.

Similarly, the temperature lowering of the gas to be processed is preferably achieved to obtain a temperature gradient in the entire exchanger.

The gas to be processed can be precooled prior to being fed into exchanger EC1, by means of an available cooling fluid such as water and/or air, in an exchanger E1 situated on line 2. This first precooling stage notably allows to separate a natural gasoline fraction consisting of the hydrocarbons condensable under the temperature and pressure conditions established at the outlet of exchanger El. Any other device allowing it to be precooled can be used without departing from the scope of the invention.

Heat exchanger EC1 can be equipped with a temperature control means CT1, for example one or several temperature detectors connected for example to control and processing means. They allow several temperature measurements to be obtained along the heat exchanger.

EXAMPLE 1

A first example of implementation of the invention, described in connection with FIG. 1, allows selective recovery of the hydrocarbon fractions or cuts contained in the natural gas, for example associated hydrocarbons containing more than three carbon atoms.

The natural gas is cooled according to the process previously described in FIG. 1.

During cooling, the natural gas becomes poorer in $C_3+$ heavy constituents and forms a liquid hydrocarbon phase that becomes richer in increasingly heavier constituents as it runs.

For a column exchanger proportioned for example to obtain the equivalent of 12 theoretical plates, it may be observed that the propane, isobutane and butane concentration in the liquid hydrocarbon phase obtained at the level of the sixth plate is for example close to 63% by mass, whereas it is about 20% in the liquid hydrocarbon phase discharged at the bottom of the equipment through line 8. Since this concentration evolves all along the column exchanger, the condensed hydrocarbon phases are advantageously drawn off in selected zones of contact and heat exchange.

The natural gas is introduced through line 2 at a flow rate of 42,837 kg/h, with a temperature of the order of 43° C. and at a pressure substantially equal to 4.5 MPa.

70% of the liquid hydrocarbon phase containing over 25% by mass of propane is for example discharged through line 4 at the level of recovery tray 3 corresponding for example to the fourth theoretical plate of the exchanger, at a temperature of about $-2°$ C. and at a flow rate of the order of 3,600 kg/h.

The hydrocarbon phase containing the most part of the constituents having carbon atoms higher than $C_4+$ is discharged through line 8 at a flow rate of 2,525 kg/h. It contains about 75% of $C_5+$ hydrocarbons.

The natural gas depleted by more than 55% of the $C_3+$ hydrocarbons is discharged at the top of the exchanger through line 9, at a flow rate of 36,715 kg/h.

Lateral recovery of the hydrocarbon fractions allows to collect a fraction containing 65% of the $C_3$ and $C_4$ constituents. The natural gasoline fraction only contains about 20%.

Furthermore, lateral recovery of the fractions according to their composition and to their condensation zone allows to obtain liquid hydrocarbon phases with different compositions, one being rich in $C_3$ and $C_4$ constituents and drawn off laterally, the other, rich in $C_5$ and $C_6$ constituents, being discharged at the bottom of the equipment, and containing as a whole less methane and ethane than in the case of a process according to the prior art. This allows the methane and ethane production yield to be increased.

The hydrocarbon fractions recovered separately can be advantageously stabilized to increase the methane and ethane yield of the process.

A first embodiment (FIG. 1) consists in using a means for heating the liquid volume collected at the bottom, for example a reboiler B1 integrated in the lower part of the exchanger. This allows to stabilize the natural gasoline fraction of the $C_1$ and $C_2$ compounds.

Figure 3:
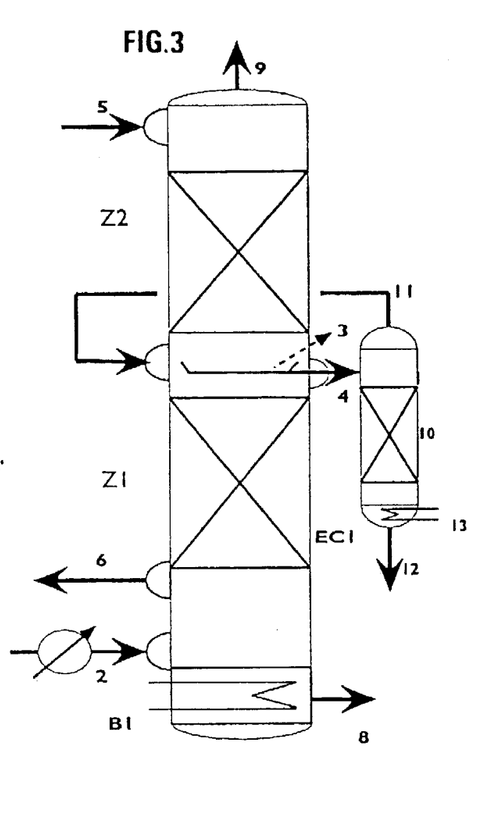
FIGS. 3 and 4 show facilities comprising a fractionating device associated with a device for stabilizing the separated phases.
Figure 4:
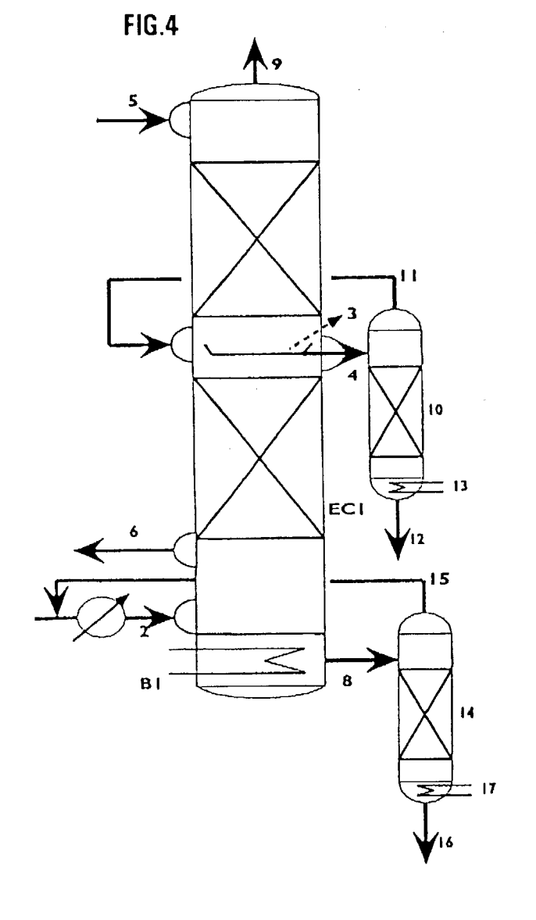

Other embodiments intended to stabilize the condensed hydrocarbons recovered (LPG and/or natural gasoline) are described in FIGS. 3 and 4.

In FIG. 3, the discharge line 4 communicating with the recovery tray 3 of FIG. 1 intended for the recovery of the condensed LPG is connected to a device 10 allowing stabilization of the discharged LPG. This device, known to the man skilled in the art, will not be described in detail here.

The complementary stabilization process consists in sending into stabilization device 10 the condensate fraction containing methane and ethane in small amounts and mainly consisting of a LPG fraction collected at the level of tray 3. The gaseous fraction rich in methane and ethane produced during stabilization is discharged through a line 11 and recycled to exchanger EC1 at the level of tray 3 in order to be recovered and mixed with the gas to be processed.

The stabilized LPG fraction is discharged at the bottom of the stabilization device, at the level of reboiler 13, through a line 12.

In FIG. 4, the plant described in FIG. 3 includes a second stabilization device 14 for stabilizing the natural gasoline discharged through line 8.

The working pattern is identical to that described in connection with FIG. 3. The condensate discharged through line 8 and containing mainly natural gasoline is sent to stabilization device 14.

The stabilized natural gasoline is discharged through line 16 at the level of reboiler 17.

The gaseous fraction mainly consisting of methane, ethane, propane and butane is discharged out of the device through line 15 in order to be recycled and mixed with the gas to be processed delivered through line 2.

These procedures advantageously allow to stabilize the LPG fractions and the natural gasoline fraction prior to their recovery by the producer, and to increase the overall methane and ethane yield of the process.

Stabilization of the LPG and natural gasoline fractions produced and separated during the process can be improved still further.

Figure 5:
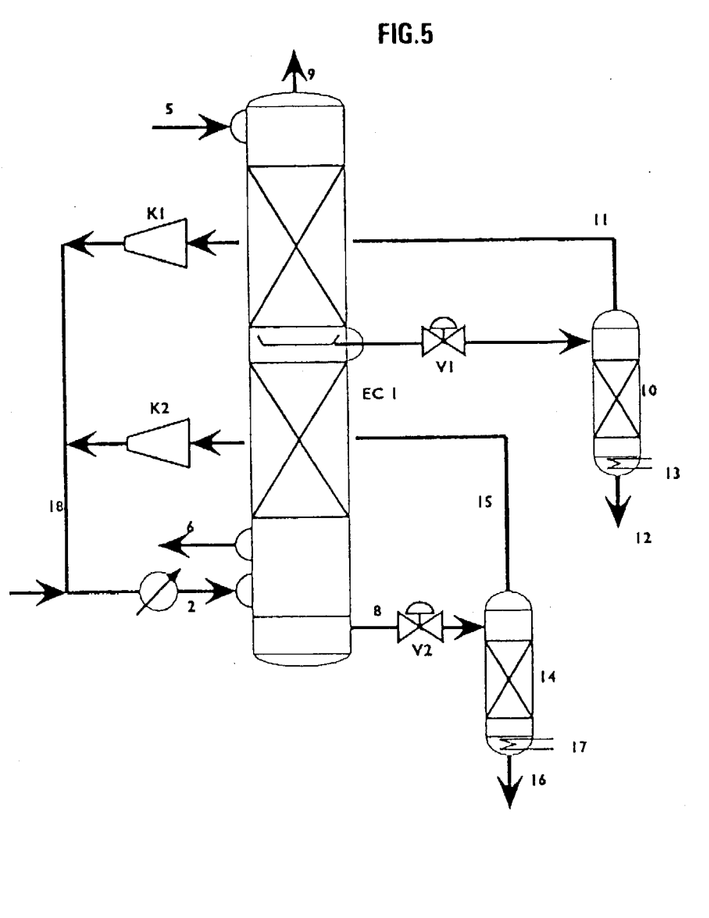
FIG. 5 shows a device for optimizing the stabilization of the fractions recovered.

To that effect, the plant described in FIG. 5 differs from that of FIG. 4 in that two relief valves V1 and V2 respectively situated on discharge lines 4 and 8 have been added thereto.

The gaseous fractions coming from stabilization devices 10 and 14 are recompressed by means such as compressors K1 and K2 prior to being driven back through a line 18 to the gas to be processed at the level of line 2.

FIGS. 6 and 7 describe embodiments of the device in which stabilization of a liquid fraction is effected in a contact and heat-exchange zone as described above.

For this purpose, at least one of the liquid fractions collected is made to pass into a contact and heat-exchange zone in which it is simultaneously:

placed in countercurrent contact with the rising vapor phase, heated by indirect heat exchange in said contact and exchange zone.

For example, in the case of two contact and heat-exchange zones Z1, Z2, the liquid fraction coming from zone Z1 can be stabilized in a contact and heat-exchange zone Z3, as shown in FIG. 6.

In this example, the gas to be processed arrives through line 50 in contact with and heat-exchange zone Z1. At the head of this contact and heat-exchange zone Z1 a gas phase is collected and is sent to contact and heat-exchange zone Z2, emerging through pipe 52 at the head of contact zone Z2. A relatively light liquid fraction is collected and evacuated through line 53.

At the bottom of contact and exchange zone Z1, a relatively heavy liquid fraction is collected and evacuated through pipe 54.

This liquid fraction is then sent to contact and heat-exchange zone Z3 in which it is simultaneously:

placed in contact with the rising vapor phase and emerges at the base of zone Z3 that has been stabilized, namely substantially freed of the lightest hydrocarbons that it contains;

heated by indirect heat exchange. This indirect heat exchange can be effected with an external heating fluid which arrives through pipe 51 and leaves through pipe 55, and with the liquid fraction which leaves zone Z3 through pipe 56 and is pumped by pump P1 to zone Z3 which it leaves, cooled, through pipe 57. The external heating fluid can be, for example, the gas to be processed once it is sufficiently hot, for example as it leaves a compression stage, or any other fluid available at the proper temperature.

It is also possible to stabilize a liquid fraction coming from a contact and exchange zone by causing it to circulate by downward flow in a contact and heat-exchange zone located below the contact and exchange zone from which said liquid fraction exited countercurrent with the vapor phase generated by heating in the contact and exchange zone in which stabilization took place.

For example, in the case of two contact and exchange zones Z1, Z2, the liquid fraction coming from zone Z1 can be stabilized in zone Z2 as shown by the diagram in FIG. 7.

In this example, the liquid fraction coming from zone Z2 is sent to zone Z1 in which it circulates countercurrently with the vapor phase generated by heating in this zone Z1. This heat exchange also contributes to cooling the gas arriving through pipe 50. The stabilized liquid fraction is evacuated through pipe 60. The vapor fraction leaving this stabilization stage is evacuated at the head of zone Z1 and sent at 61 to zone Z2.

The liquid fractions leaving one of the contact and heat-exchange zones can also be stabilized in a contact and heat-exchange zone operating at a higher temperature, after expansion to facilitate the stabilization operation.

The vapor fractions leaving such a stabilization stage must in this case be recompressed before being sent to a higher contact and exchange zone.

The process according to the invention thus allows the condensable fractions that are contained in a gas to be processed, to be separated, fractionated, and stabilized.

For example, in the case of a natural gas, using three contact and heat-exchange zones Z1, Z2 and Z3, operating according to the diagram of FIG. 6, it is possible to have a gasoline fraction stabilized at $C_5+$ at the base of zone Z3 and an LPG fraction at the base of zone Z2 which can be stabilized in zone Z3, operating according to the diagram of FIG. 7.

By having a fourth contact and exchange zone Z1, Z2 located above zone Z1, Z2, and operating at a lower temperature, it is possible also to separate a fraction C2 which can be stabilized by heat exchange, circulating for example in zones Z1 and/or Z2.

Advantageously, the process is partly or totally self-cooled, i.e. cooling is provided at least partly by the processed gas depleted in heavy hydrocarbons.

Figure 8:
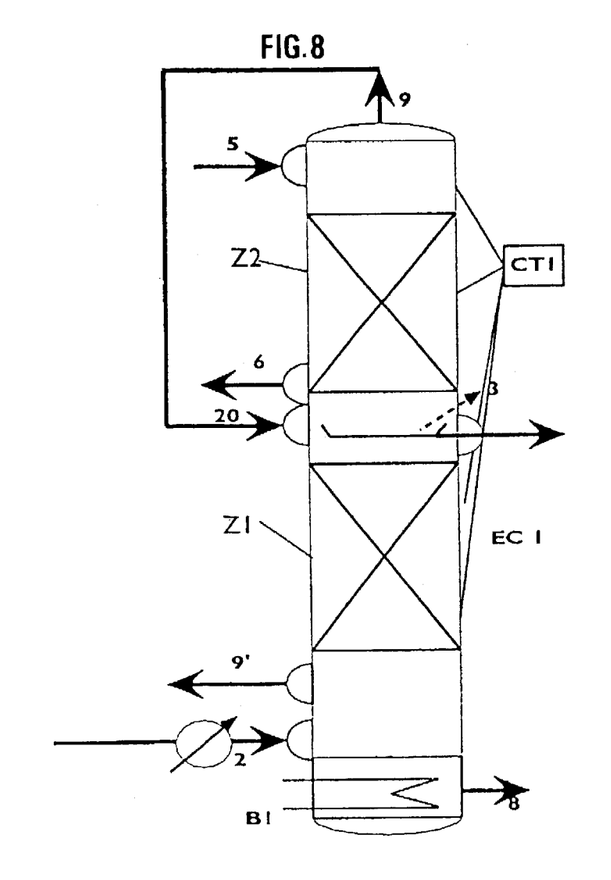
FIGS. 8 and 9 show two embodiment variants of a cooling circuit providing separation of the hydrocarbon fractions.

FIG. 8 diagrammatically shows a variant in which heat exchanger EC1 is provided with a first cooling circuit achieved by means of an external heat-transfer fluid flowing in through line 5 and leaving through line 6, lines 5 and 6 being situated in the upper part thereof, and a complementary cooling circuit provided by at least part of the processed gas discharged from the exchanger through line 9, flowing in through a line 20 preferably situated below heat-transfer fluid discharge line 6, and leaving through a line 9' at the level of the lower part of the exchanger.

The external heat-transfer fluid cools down at least partly the gas circulating in the upper part of the exchanger.

A liquid fraction mainly comprising the heaviest constituents initially contained in the gas and condensed during the process is discharged through line 8.

This liquid fraction can be stabilized according to an embodiment described above in FIGS. 1, 3, 4 and 5.

According to another embodiment, the plant is self-cooled by using at least part of the processed gas coming from line 9 as a cooling agent.

Figure 9:
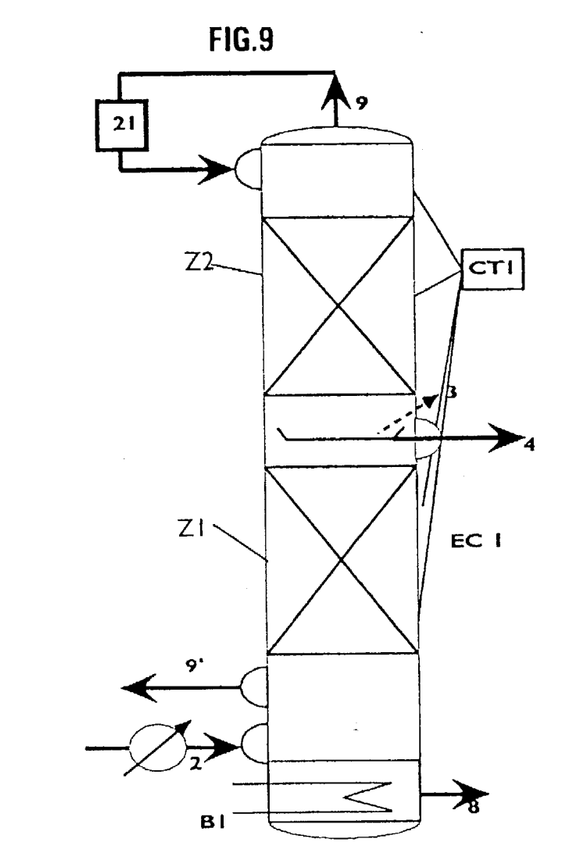

Such an instance is illustrated by the embodiment example schematized in FIG. 9. The processed gas flowing out at the top of exchanger EC1 through line 9 is cooled in a device 21, for example by expansion through a valve or by expansion through a turbine. The gas cooled thereby is re-injected into exchanger EC1 where it lowers the temperature of the gas to be processed by heat exchange. It flows out, after heat exchange, through line 9' prior to being sent, for example, to another process facility and/or to a transportation line.

The gas discharged through line 9' can possibly flow into a compression device after the exchanger (not shown) so as to be transferred.

Figure 10A:
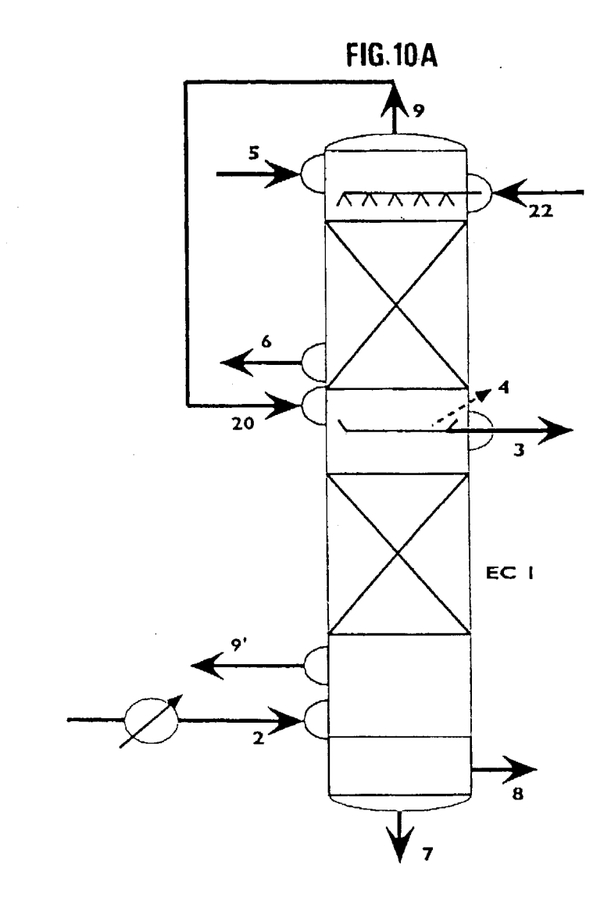
FIGS. 10A and 10B show embodiment variants of the device of FIG. 1 provided with a line for delivering a solvent or a fluid other than the gas to be processed.

In some cases, it may be interesting to subject the natural gas to a processing other than fractionation, according to a pattern described for example in FIG. 10A.

Thus, by injecting a solvent in determined amount, dehydration of the natural gas can be achieved at the same time as its fractionation.

To that effect, the device of FIG. 1 is provided with at least one delivery line 22 preferably situated at the level of the exchanger head.

Inside the exchanger, the gas is simultaneously:

contacted, preferably in a countercurrent flow and continuously, with the descending liquid phase containing the solvent, and cooled by indirect heat exchange according to one of the processes described above.

This cooling causes condensation of the heavy hydrocarbons contained in the gas and of part of the saturation water of the gas. These two condensed liquid phases flow down the device by gravity, in a countercurrent flow in relation to the processed gas that becomes progressively poorer in heavy constituents ($C_3+$ and higher hydrocarbons) because of the matter exchange between the gas phase and the liquid hydrocarbons.

The condensed liquid hydrocarbon phase becomes gradually richer in heavier constituents as it flows downwards and the solvent-rich condensed aqueous phase at the exchanger top becomes poorer in solvent by contact with the gas.

After decanting, the aqueous phase containing practically no more solvent is discharged through line 7 and the liquid hydrocarbon phase is discharged through line 8.

The vaporized solvent carried along in the gas phase allows hydrate formation problems due to cooling to be prevented.

A solvent at least partly miscible with water is used. Its boiling-point temperature is preferably lower than that of water or it forms with the water an azeotrope whose boiling-point temperature is lower than that of water so that it can be carried along by the non-condensed gas.

This solvent is for example an alcohol and preferably methanol. It can also be selected from the following solvents: methylpropylether, ethylpropylether, dipropylether, methyltertiobutylether, dimethoxymethane, dimethoxyethane, ethanol, methoxyethanol, propanol, or selected from different solvent classes such as, for example, amines or ketones, or a mixture formed from one or several of these products.

The amount of solvent to be injected is usually adjusted according to the temperature, the pressure and/or the composition of the gas so as to prevent the formation of hydrates and of frazil crystals due to the presence of water.

Thus, for example, the molar ratio of the flow of solvent to the flow of processed gas ranges between 1/1000 and 1/10.

The treating process is advantageously optimized by adjusting the amount of solvent injected according to the composition of the gas and/or to the operating conditions, for example the temperature and/or the temperature variation and/or the pressure. For example, the temperature or temperature gradient values measured by the temperature detectors situated at the level of the exchanger are therefore taken into account.

Operations performed thereafter on the processed gas from the enclosure are preferably also taken into account.

By countercurrent circulation, the gas carries along the solvent contained in the liquid phases flowing downwards by gravity. These liquid phases are collected at the bottom, substantially stripped from solvent. The solvent injected at the top is thus mainly discharged in the gas phase discharged at the top. The amount of solvent injected can thus be adjusted in order to obtain the required concentration level in this gas phase so as to prevent hydrate formation, considering the temperature and pressure conditions.

The solvent content of the gas phase is generally reduced and it is all the lower as the temperature is low. The amount of solvent injected at the top is thus relatively low and constitutes a makeup intended to compensate the losses in the gas.

The solvent injected at the top is not necessarily pure and can be, for example, mixed with water, provided that the solvent concentration in the aqueous phase allows hydrate formation to be prevented.

Injection of a solvent also allows to separate constituents other than water. Unsaturated hydrocarbons can thus be separated by using a polar solvent allowing them to be selectively absorbed. The solvent is for example an ether, an alcohol or a ketone.

A solvent consisting of a hydrocarbon cut is for example injected to remove the hydrocarbons present in the gas.

Figure 10B:
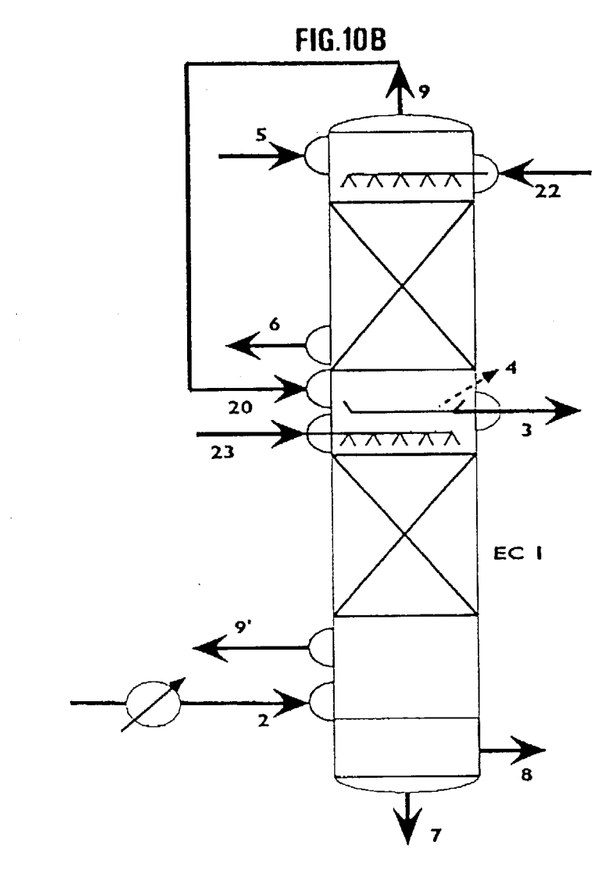
Figure 11:
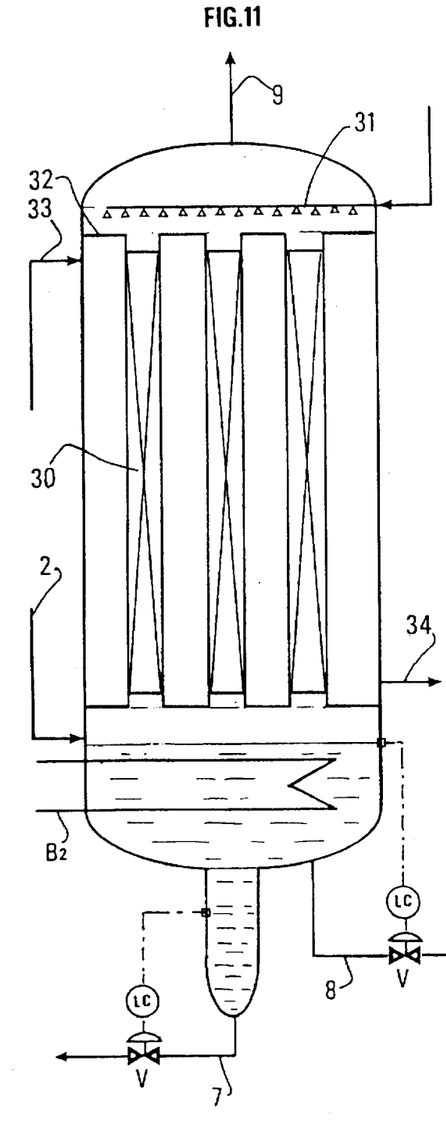
FIGS. 11, 12 and 13 are examples of the technologies used to form the device.

FIG. 10B describes an embodiment allowing injection of other fluids at the level of the exchanger, for example solutions containing a solvent from another stage of the process.

In some cases, it is advantageous to recover the solvent that can come from a LPG washing stage performed outside exchanger EC1 by liquid-liquid extraction with water. In fact, the hydrocarbon phase enriched in propane and butane extracted through line 4 is close to equilibrium with an aqueous solution containing the solvent and a vapour phase also containing a solvent fraction. The extracted hydrocarbon phase therefore contains traces of the solvent and it is thus washed outside.

Tray 3 is equipped with at least one line 23 allowing injection of this wash water that contains at least partly the solvent dissolved in the extracted hydrocarbon phase.

This wash water is brought into countercurrent contact with the gas to be processed, to which it yields, by matter transfer, the amount of solvent that dissolves in the gas.

The line for re-injecting the liquid phase containing the solvent to be recovered can be positioned at the top of the exchanger and/or at any level of this exchanger.

EXAMPLE 2

A second example of implementation of the process according to the invention, described in connection with FIG. 10A, allows to obtain, from a natural gas containing associated higher hydrocarbons, a dehydrated gas greatly depleted in constituents comprising at least three carbon atoms per molecule.

Heat exchanger EC1 is for example a column type exchanger as previously described in example 1.

The mass composition of the natural gas is for example as follows:

| | |
|---|---|
| Water | 82,30 |
| Methanol | 0,00 |
| Nitrogen | 211,97 |
| Carbon dioxide | 397,79 |
| Methane | 25,765,00 |
| Ethane | 6,028,62 |
| Propane | 4,360,50 |
| Isobutane | 1,335,05 |
| Butane | 487,21 |
| Isopentane | 668,81 |
| Pentane | 528,87 |
| Hexane | 1,053,47 |
| Total kg/h | 42,919,59 |

The natural gas is introduced through line 2 at a flow rate of about 42,920 kg/h, at a temperature close to 43° C. and at a pressure of the order of 4.5 MPa. The amount of methanol injected through line 22 is for example 13.9 kg/h in order to maintain a methanol concentration gradient in the aqueous phase formed in the exchanger corresponding to a concentration ranging between 99% by mass at the top of the exchanger at a temperature of −23° C. and 0.01% by mass at the bottom of the exchanger for a temperature of about 43° C.

At the level of recovery means 3 and 4 (example 1), corresponding for example to the fourth theoretical plate of the exchanger, 70% of the liquid hydrocarbon phase containing over 25% by mass of propane is discharged through line 4 at a temperature of about −2° C. and at a flow rate of the order of 3,600 kg/h.

The aqueous phase and the hydrocarbon phase comprising the most part of the constituents having carbon atoms higher than $C_4+$ are discharged after decanting through line 8.

The liquid hydrocarbon phase comprising notably $C_5+$ hydrocarbons, that is discharged through line 8 at a rate of 2,525 kg/h, contains over 75% of the $C_5+$ hydrocarbons.

The dehydrated natural gas depleted in condensable hydrocarbons is discharged through line 9 at a rate of about 36,715 kg/h. It is depleted by more than 55% of the $C_3+$ hydrocarbons and practically totally stripped from the $C_5+$ compounds.

Various technologies known to the man skilled in the art can be used for the exchanger and the associated means or devices, some of which are described hereafter by way of non limitative examples.

Exchanger EC1 is for example a shell-and-tube exchanger such as that schematized in FIG. 9.

The gas to be processed, delivered through line 2, circulates upwards inside vertical tubes 30. These tubes are preferably provided with a packing, for example a stacked packing allowing contact between the ascending gas and the descending liquid fractions to be improved. The processed gas is discharged at the top through line 9.

For devices achieving simultaneously gas dehydration and fractionation, the solvent introduced through line 22 (FIGS. 10A and 10B) is fed into the various tubes 30 through a loading rack 31 and a distribution plate 32.

The liquid hydrocarbon phase stabilized by heating by means of a reboiler B2 situated in the lower part of exchanger EC1, for example, is discharged under level control through line 8 and the aqueous phase is discharged under level control through line 7.

Cooling is provided by a heat-transfer fluid fed into the exchanger through line 33 and discharged after heat exchange through line 34.

Figure 12:
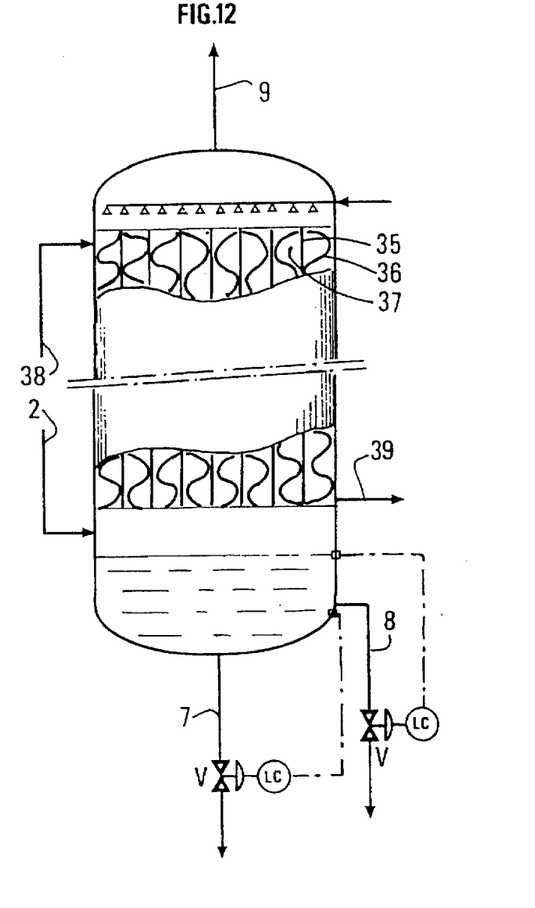

According to another technology, exchanger EC1 is a plate exchanger, for example made of brazed aluminium, such as that schematized in FIG. 12.

Such an exchanger consists of an assembly of plane plates 35 between which intercalary corrugated plates 36 allowing to hold the assembly mechanically in position and to improve heat transfer are inserted.

These plates delimit channels 37 in which the fluids taking part in the heat exchange during the process circulate.

The gas to be processed, fed into the exchanger through line 2, circulates in channels 37 in an ascending direction while being progressively cooled by the heat-transfer fluid. The intercalary corrugated plates 36 acting as a stacked packing promote contact between the ascending gas and the descending liquid fractions.

The solvent fed into line 22, in the case of simultaneous dehydration and fractionation processes, is evenly distributed above channels 37 where the gas to be processed circulates.

In case of a self-cooled process, the dehydrated gas is discharged at the exchanger top through line 9, cooled by expansion, according to a process described in FIG. 9 for example, and re-introduced at the level of the upper part of the exchanger through line 38 that opens substantially perpendicular to the plane of the section shown in FIG. 12 into a channel supply enclosure that is not shown in the figure. It is discharged after heat exchange through line 39 that runs perpendicular to the plane of the section shown in FIG. 13, the line being connected to a channel discharge enclosure that is not shown in the figure. The supply and discharge enclosures are devices known to the man skilled in the art allowing passage of the fluids circulating in each of the channels into the discharge line, and conversely distribution of the fluid coming from a line into the various channels.

The liquid hydrocarbon phase, possibly stabilized by reboiler B3, is discharged under level control (LC, V) through line 8 and the aqueous phase is discharged under level control through line 7.

Other types of plate exchangers may also be used, for example exchangers provided with stainless steel plates welded to one another, either by butt welding or welded over the total surface thereof, for example by means of a diffusion welding technique.

The plates can also be formed by explosion or chemically etched.

The man skilled in the art may of course use any well-known technique available for improving the contact between the phases and/or the fluid distribution without departing from the scope of the invention.

Figure 13:
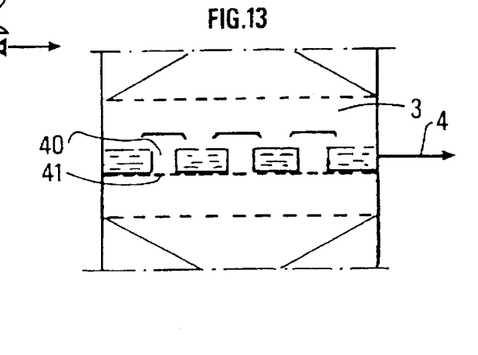

FIG. 13 diagrammatically shows an embodiment example of a tray allowing phases to be recovered as a function of their nature, according to a process described in FIG. 4 for example.

Tray 3 comprises risers 40 allowing the gas to flow in an ascending direction towards the upper part of the exchanger. The liquid phase that is recovered on this tray can be discharged through line 4 with a controlled flow rate, but it may also flow out by overflow towards the lower part of the exchanger. It is thus possible to collect only a fraction of the liquid phase coming from the upper part of the exchanger.

If two liquid phases are collected on the tray, for example a liquid hydrocarbon phase and an aqueous phase, they can be discharged at least partly separately. The aqueous phase, that is heavier, tends to accumulate at the bottom of the tray and it can be discharged for example through perforations 41 provided in the tray.

Any other mode of discharge of one or the other of the phases known to the man skilled in the art may be used without departing from the scope of the invention.

In general, any heat-exchange technology can be used provided it allows:

countercurrent heat exchanges, independent circulation of several fluids that can be brought in and evacuated independently.

Figure 14:
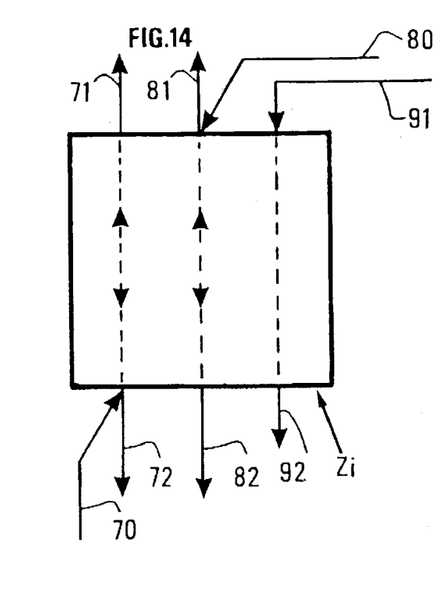
FIG. 14 is an example of the technologie allowing the heat exchange and the matter exchange.

A contact and heat-exchange zone Z1 must thus be able to be operated according to the diagram of FIG. 14 simultaneously ensuring passage:

of one or more gas fractions arriving through pipe 70, circulating countercurrently with a liquid phase generated by cooling in zone Z1, producing a gas fraction evacuated at the head of zone Z1, through pipe 71, and a liquid fraction evacuated at the bottom of zone Z1 via pipe 72;

of one or more liquid fractions arriving through pipe 80, circulating countercurrently with a vapor phase generated by heating in zone Z1, producing a gas fraction evacuated at the head of zone Z1, through pipe 81 and a liquid fraction evacuated at the bottom of zone Z1 through pipe 82, of one or more fluids contributing to the cooling or heating of zone Z1 by an example a cooling fluid can, for example, arrive through pipe 91 at the head of zone Z1 and be evacuated through pipe 92 at the bottom of zone Z1.

We claim:

1. A process for fractionating and/or for treating a gas containing at least two constituents A and B, such that the boiling-point temperature of constituent A is higher than the boiling-point temperature of constituent B, comprising at least the two cooling and contacting stages as follows:

a) during a first stage, said gas is cooled at least partly in order to cause condensation of at least a first liquid fraction and said gas is brought into contact with said liquid fraction in at least a first zone of contact Z1, the first liquid fraction circulating in a countercurrent flow in relation to the gas, and at least a liquid fraction enriched in constituent A and at least a gaseous fraction are collected separately at the outlet of said first zone of contact Z1, b) during a second stage, said gaseous fraction from stage a) is at least partly cooled in order to cause condensation of at least a second liquid fraction and said gaseous fraction is brought into contact with said second liquid fraction in at least a second zone of contact Z2, the gaseous fraction circulating in a countercurrent flow in relation to the second liquid fraction, and at least a liquid fraction enriched in constituent B and at least a gaseous fraction are collected separately at the outlet of said second zone.

2. A process as claimed in claim 1, wherein contact between the ascending gas phase and the descending liquid fraction or fractions is achieved at least partly in a countercurrent flow in at least one of said zones Z1, Z2.

3. A process as claimed in claim 1, wherein the cooling performed in at least one of the zones of contact Z1, Z2 is provided by an at least partly continuous and countercurrent heat exchange over at least part of the zone of contact.

4. A process as claimed in claim 1, wherein several successive cooling and contacting stages are carried out in order to obtain n liquid fractions having different, for example increasing volatilities, the liquid fractions resulting from the successive stages being discharged progressively and the gaseous fraction coming from each of the stages is sent to the next stage so as to obtain a gaseous fraction depleted in condensable constituents at the outlet of the last stage.

5. A process as claimed in claim 1, wherein a solvent and/or another fluid is injected at the level of at least one of said cooling and contacting stages.

6. A process for fractionating and/or for treating a fluid containing at least a gas phase and at least two constituents A and B differing in at least one parameter in the conditions of the process, allowing separation thereof from the gas phase and/or separation from one another, comprising at least the two stages as follows:

a first stage in which said fluid is injected into a first zone Z1 to achieve contacting of said fluid, with matter exchange, and of the phases containing said constituents that can be separated according to at least one characteristic parameter, and to achieve separation of said fluid constituents and of the gas phase, so as to form at least a first phase containing at least one of said constituents, for example constituent A, said first phase being separated from said fluid, and a second stage in which the fluid depleted in constituent A is sent to a second zone Z2 to achieve contacting, with matter exchange, of said fluid and of the phases containing said separated constituents, and to achieve separation of said remaining constituents from the gas phase, to produce a second phase containing at least one of the constituents other than constituent A, such as constituent B, and a gas phase depleted in separated constituents.

7. A device for fractionating a fluid containing at least a gas phase and at least two constituents differing in a parameter in the conditions of the process, allowing separation thereof from the gas phase and/or separation from one another, comprising at least a first and a second zone (Z1, Z2), each comprising:

a main circuit allowing matter exchange between the gas to be processed circulating in a countercurrent flow in relation to the condensed constituents so as to obtain separately, at the zone outlet, a liquid fraction enriched in constituent having condensed and a gaseous fraction, said zones being separated by at least one means for drawing off or for extracting at least one of said constituents having condensed in the zone situated above the extraction means, at least one of said zones being connected to a line (2) for delivering said gas to be processed, and/or to at least one line (4, 8) for discharging one of said separated constituents, the other zone being connected to a line for discharging the gas phase depleted in separated constituents.

8. A device as claimed in claim 7, wherein the parameter selected for differentiating the constituents is the boiling-point temperature, and the separation means include at least one cooling circuit (5, 6) communicating indirectly with said main contacting circuit, in order to provide condensation of the different constituents, the condensed liquid phase being discharged through line (8).

9. A device as claimed in claim 7, comprising at least one line for delivering a fluid such as a solvent, said line being connected to the upper part of the main circuit.

10. A device as claimed in claim 7, comprising at least one fluid delivery line situated at the level of at least one of said recovery means and/or at the level of one of said zones.

11. A device as claimed in claim 7, comprising at least one means for stabilizing at least one of said liquid fractions drawn off.

12. A device as claimed in claim 11, wherein said stabilization means are included in the fractionating device.

13. A device as claimed in claim 11, wherein said stabilization means comprises at least a zone of contact and heat exchange.

14. A device as claimed in claim 8, wherein said cooling circuit is provided by at least part of the processed gas.

15. Application of the process as claimed in claim 1 for fractionating a natural gas containing at least water, methane and condensable hydrocarbons such as $C_3+$ and/or possibly $C_2+$ hydrocarbons.

* * * * *